(12) United States Patent
Chen et al.

(10) Patent No.: US 7,784,742 B2
(45) Date of Patent: Aug. 31, 2010

(54) COMPUTER ENCLOSURE WITH LIGHT-EMITTING MEMBER BRACKET

(75) Inventors: Yun-Lung Chen, Taipei Hsien (TW); Qing-Hao Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 401 days.

(21) Appl. No.: 11/733,773

(22) Filed: Apr. 11, 2007

(65) Prior Publication Data

US 2008/0135715 A1 Jun. 12, 2008

(30) Foreign Application Priority Data

Dec. 8, 2006 (CN) .................... 2006 2 0016245 U

(51) Int. Cl.
*G12B 9/00* (2006.01)
(52) U.S. Cl. .................. 248/27.1; 248/27.3; 248/71; 362/219; 362/253
(58) Field of Classification Search ................ 248/27.1, 248/27.3, 201, 71; 362/457, 396, 219, 253
See application file for complete search history.

(56) References Cited

U.S. PATENT DOCUMENTS

| 5,238,427 | A | * | 8/1993 | Fry et al. ................. 439/557 |
| 5,338,211 | A | * | 8/1994 | Kodama et al. ............. 439/135 |
| 5,343,006 | A | * | 8/1994 | Moffett .................... 200/296 |
| 6,360,999 | B1 | | 3/2002 | Liao |
| 6,502,958 | B1 | * | 1/2003 | Chen ....................... 362/396 |
| 7,441,728 | B2 | * | 10/2008 | Chen et al. ................ 248/27.1 |
| 2004/0182973 | A1 | * | 9/2004 | Kawai ...................... 248/71 |
| 2007/0121318 | A1 | * | 5/2007 | Nanbu ...................... 362/228 |

* cited by examiner

*Primary Examiner*—Amy J Sterling
(74) *Attorney, Agent, or Firm*—Frank R. Niranjan

(57) ABSTRACT

A bracket (100) for mounting a light-emitting member (50) to a computer enclosure, includes a first holding member (10) and a second holding member (30) connecting with the first holding member via a connecting arm which is capable of being fold to cause the first holding member to overlap and detachably engage with the second holding member to hold the light-emitting member (50) therebetween. Each of the first and second holding members forms a pair of hooks configured for engaging with the computer enclosure.

7 Claims, 4 Drawing Sheets

COMPUTER ENCLOSURE WITH LIGHT-EMITTING MEMBER BRACKET

BACKGROUND

1. Technical Field

The present invention relates to computer enclosures, and more particularly to a computer enclosure with a mounting structure for light-emitting member.

2. General Background

A light-emitting member, such as a light-emitting diode (LED), is used to indicate a working state of a computer. In order to protect the light-emitting member, a conventional mounting bracket is usually provided. The conventional mounting bracket defines a hole therein for the light-emitting member being inserted thereinto. However, because the light-emitting member is small, it is very inconvenient to insert the light-emitting member into the hole defined in the conventional mounting bracket. Furthermore, the light-emitting member often becomes loose because of vibrations generated by use of the computer. Thus, the light-emitting member is not sufficiently protected by the conventional mounting bracket.

What is needed, therefore, is a computer enclosure having a bracket for securely and conveniently receiving a light-emitting member therein.

SUMMARY

A bracket for mounting a light-emitting member to a computer enclosure, includes a first holding member and a second holding member connecting with the first holding member via a connecting arm which is capable of being fold to cause the first holding member to overlap and detachably engage with the second holding member to hold the light-emitting member therebetween.

Other advantages and novel features will be drawn from the following detailed description of preferred embodiments with attached drawings, in which:

DETAILED DESCRIPTION OF PREFERRED EMBODIMENTS

Figure 1:
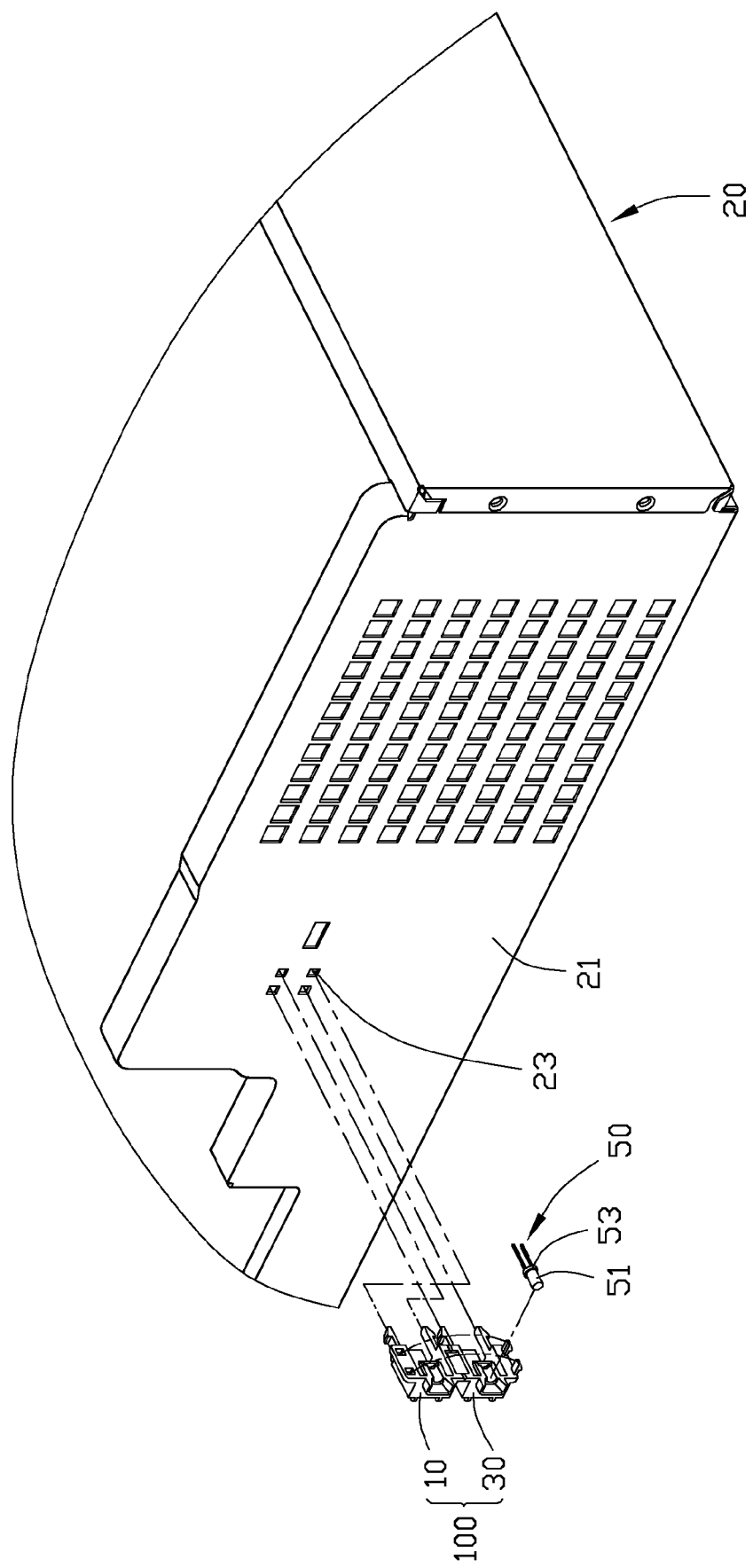
FIG. 1 is an exploded, isometric view of a chassis, a bracket, and a light-emitting member in accordance with a preferred embodiment of the present invention.

Referring to FIG. 1, a computer enclosure includes a chassis 20, and a bracket 100 configured for securing a light-emitting member 50 on the chassis 20. The chassis 20 includes a front plate 21. Four mounting holes 23 are defined in the front plate 21.

Figure 2:
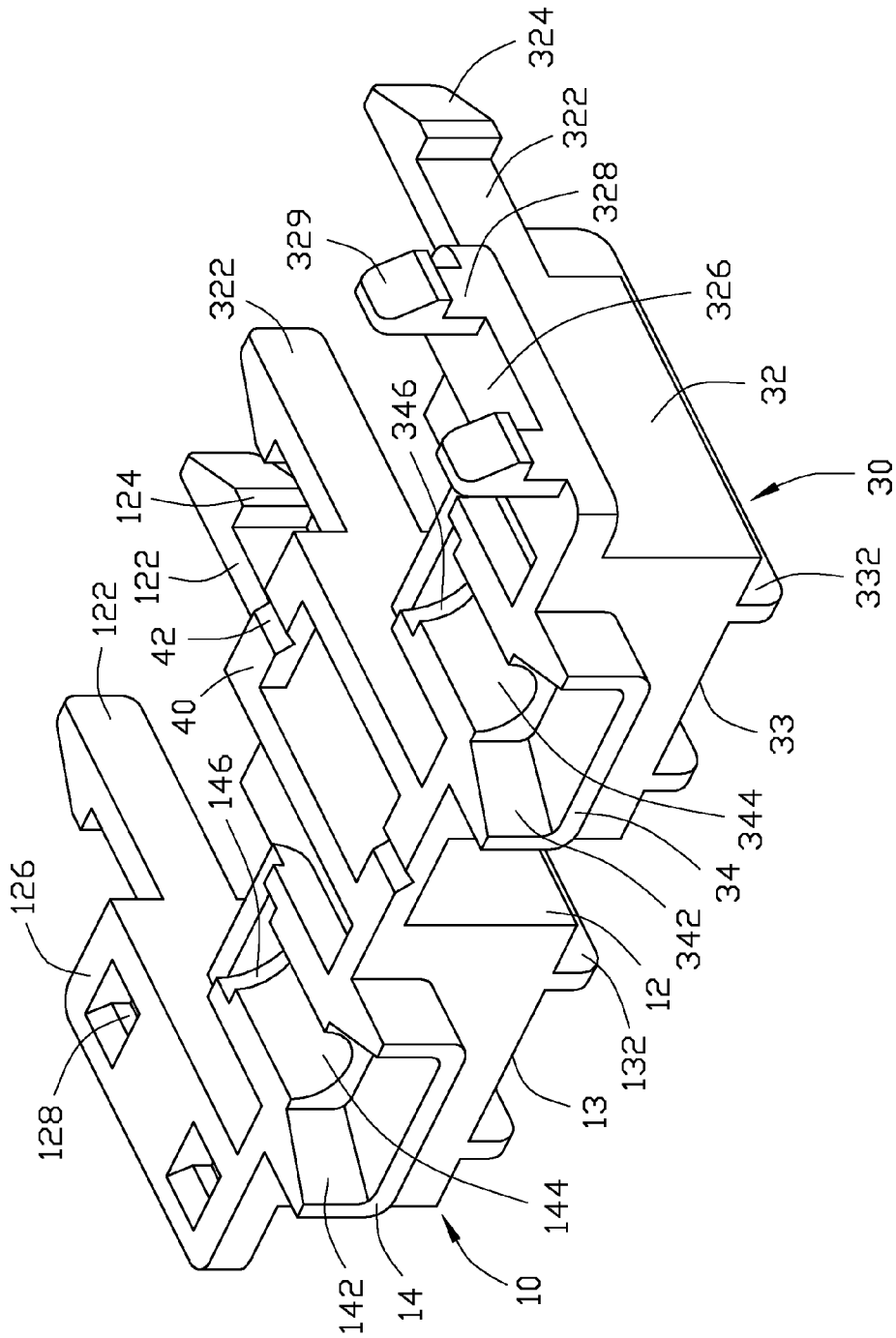
FIG. 2 is another isometric view of the bracket of FIG. 1.

Referring also to FIG. 2, the bracket 100 includes a first holding member 10 and a second holding member 30 integrally formed with the first holding member 10. Each of the first and second holding members 10, 30 includes a pair of side walls 12, 32, and a bottom wall 13, 33 perpendicular to the side walls 12, 32. Each of the side walls 12, 32 has a first hook 122, 322 extending rearward therefrom. Each first hook 122, 322 forms a locking portion 124, 324 at a free end thereof. Two adjacent side walls 12, 32 of the first and second holding members 10, 30 are connected with each other via two connecting arms 40, and the other side walls 12, 32 have support walls 126, 326 perpendicularly bent out from top edges thereof. Each of the connecting arms 40 defines a V-shaped cutout 42 in a middle portion thereof, so that the connecting arm 40 is capable of being folded and thereby the second holding member 30 is capable of being rotated relative to the first holding member 10. The support wall 126 of the first holding member 10 defines two locking holes 128 therein. The support wall 326 of the second holding member 30 has two second hooks 328 perpendicularly formed thereon, corresponding to the locking holes 128 of the support wall 126 of the first holding member 10. Each of the second hooks 328 forms a locking portion 329, such as a barb, at a free end thereof. Two parallel flanges 132, 332 are perpendicularly formed on outside surfaces of the bottom walls 13, 33. The parallel flanges 132, 332 are parallel to the side walls 12, 32 of the bracket 100. Each of the first and second holding members 10, 30 forms a receiving portion 14, 34 among the side walls 12, 32 and the bottom wall 13, 33. Each of the receiving portions 14, 34 defines a first slot 142, 342 in a front end portion thereof, a second slot 144, 344 in a middle portion thereof, and a third slot 146, 346 in a rear end portion thereof. Each of the second slots 144, 344 is half cylindrical shape. Each of the third slots 146, 346 is semi-circular shape and has a radius greater than that of the second slot 144, 344. The first slots 142, 342 and the third slots 146, 346 are arranged at opposite sides of the respective second slots 144, 344 and communicate the respective second slots 144, 344.

Referring to FIG. 1, the light-emitting member 50 may be an LED in this embodiment, and includes a cylindrical light-emitting portion 51 and an annular base portion 53 formed at one end of the light-emitting portion 51, respectively corresponding to the second slot 144, 344 and the third slot 146, 346 of the bracket 100. The base portion 53 has a greater diameter than the light-emitting portion 51, and two terminals extending therefrom to electrically connect with a power supply (not shown).

Figure 3:
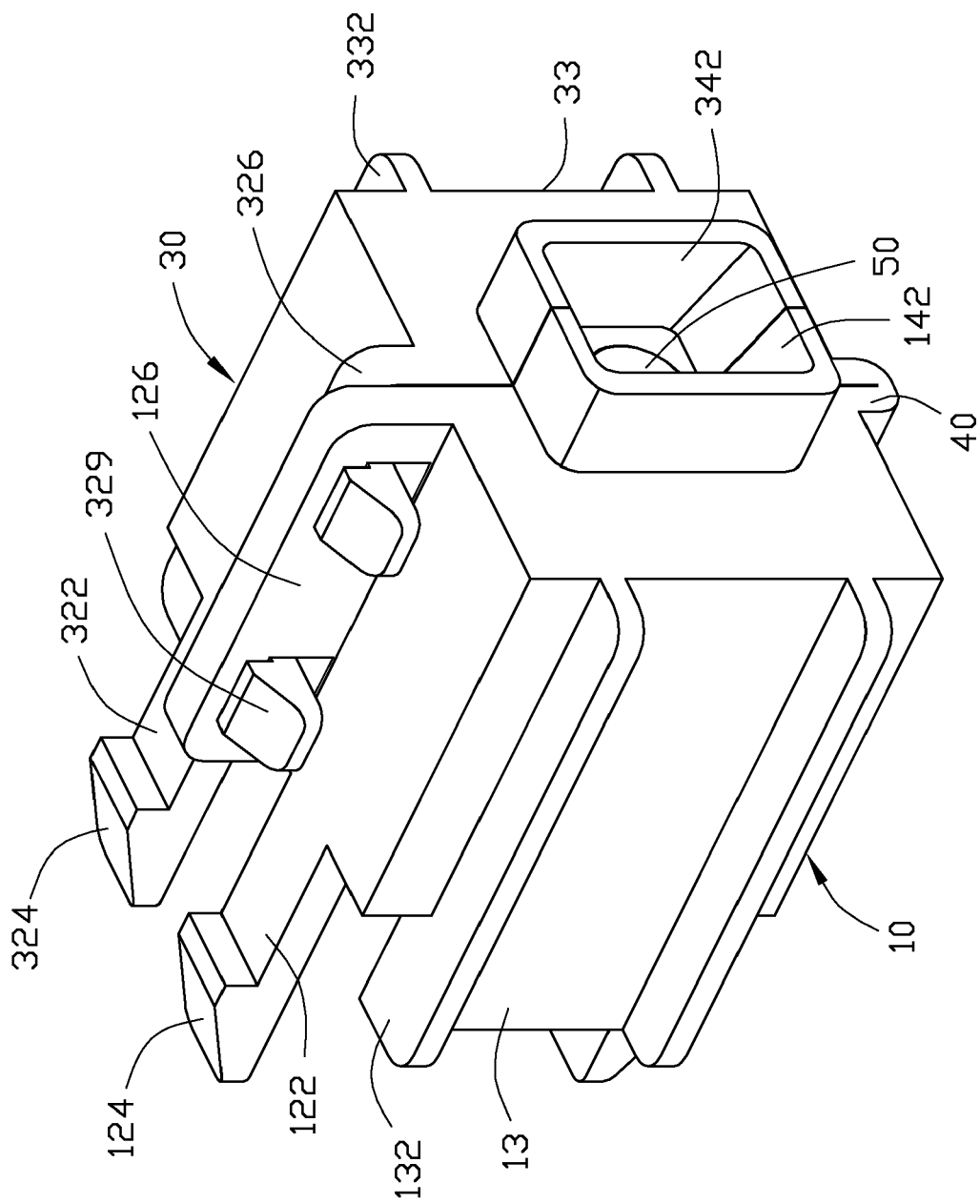
FIG. 3 is an assembled view of the bracket and the light-emitting member of FIG. 1.
Figure 4:
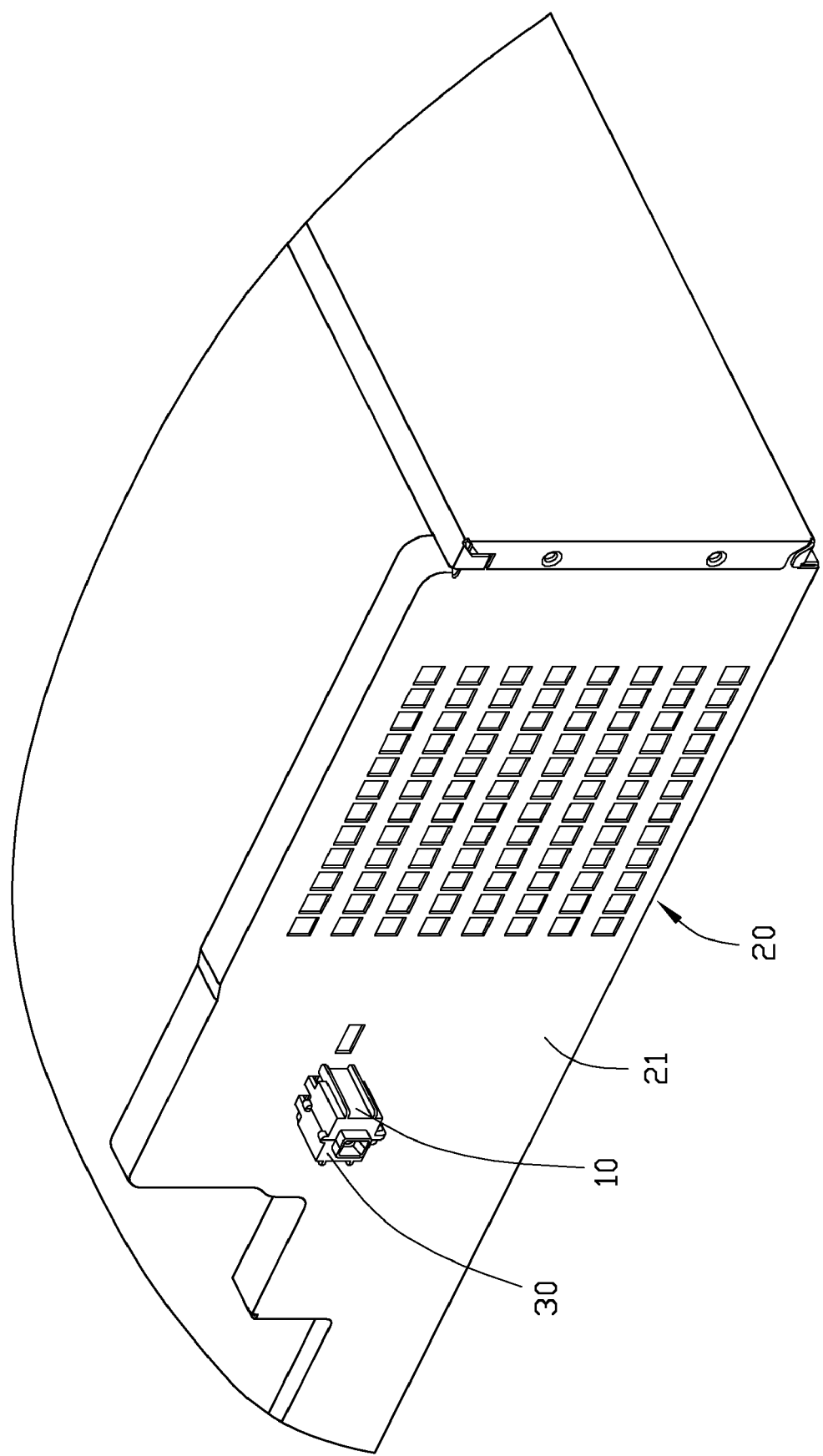
FIG. 4 is an assembled view of FIG. 1.

Referring also to FIG. 3, in assembly, the light-emitting portion 51 and the base portion 53 of the light-emitting member 50 are respectively placed into the second slot 144 and the third slot 146 of the first holding member 10. The second holding member 30 is rotated relative to the first holding member 10 until the locking portions 329 of the second holding member 30 insert into and lock into the locking holes 128 of the first holding member 10. The connecting arms 40 are folded. The second slot 344 and the third slot 346 of the second holding member 30 respectively receive the other half of the light-emitting portion 51 and the base portion 53 of the light-emitting member 50. The light-emitting member 50 is thus sandwiched between the receiving portions 14, 34 of the first and second holding members 10, 30. Then the bracket 100 together with the light-emitting member 50 is secured on the front plate 21 when the first hooks 122, 322 of the bracket 100 are inserted into and locked into the corresponding mounting holes 23 of the front plate 21.

In this embodiment, the first slots 142, 342 of the first and second holding members 10, 30 are used to guide light emitted by the light-emitting member 50.

In this embodiment, the light-emitting member 50 is received into the second slots 144, 344 and the third slots 146, 346 of the bracket 100 after the second hooks 328 of the second holding member 30 are locked into the corresponding locking holes 128 of the first holding member 10, so the light-emitting member 50 is securely sandwiched between the first and second holding members 10, 30 of the bracket 100. Because the diameter of the base portion 53 is greater than that of the light-emitting portion 51 of the light-emitting member 50 and the third slots 146, 346 have radiuses greater than that of the second slots 144, 344 of the bracket 100, the light-emitting member 50 is impossible to slide out from the second slots 144, 344 and the third slots 146, 346 of the first and second holding members 10, 30. Therefore, the light-emitting member 50 cannot become loose by vibration of the chassis 20.

In this embodiment, the cutouts 42 of the connecting arms 40 may also be U-shaped or shaped for conveniently folding the connecting arms.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer enclosure comprising:
a chassis comprising a front plate, the front plate defining at least one mounting hole therein; and
a bracket comprising a first holding member and second holding member connecting with the first holding member, the second holding member capable of being rotated to overlap the first holding member to sandwich a light-emitting member therebetween, at least one hook being formed on at least one of the first and second holding members for engaging in the at least one mounting hole to secure the bracket on the front plate of the chassis;
wherein a guiding slot is defined in the at least one of the first and second holding members to guide light emitted by the light-emitting member.

2. The computer enclosure as described in claim 1, wherein a connecting arm connects the first and second holding members, a cutout being defined in the connecting arm so that the connecting arm is foldable and the second holding member is rotatable.

3. The computer enclosure as described in claim 2, wherein the cutout is shaped for conveniently folding the connecting arm.

4. The computer enclosure as described in claim 2, wherein the cutout of the connecting arm is V-shaped.

5. The computer enclosure as described in claim 2, wherein the cutout of the connecting arm is U-shaped.

6. The computer enclosure as described in claim 1, wherein the first holding member defines a locking hole therein, and the second holding member forms a hook thereon for engaging in the locking hole of the first holding member to prevent the second holding member rotating away from the first holding member.

7. The computer enclosure as described in claim 6, wherein at least one of the first and second holding members defines at least one slot therein for receiving the light-emitting member when the hook of the second holding member is engaged in the locking hole of the first holding member.

* * * * *